United States Patent
Onoda et al.

(10) Patent No.: US 9,941,086 B2
(45) Date of Patent: Apr. 10, 2018

(54) ELECTRICAL COMPONENT UNIT, FUSIBLE LINK UNIT, AND FIXING STRUCTURE

(71) Applicant: Yazaki Corporation, Tokyo (JP)

(72) Inventors: Shinya Onoda, Makinohara (JP); Yoshinori Ishikawa, Makinohara (JP); Tatsumasa Itagaki, Susono (JP); Takahiro Shiohama, Susono (JP)

(73) Assignee: Yazaki Corporation, Tokyo (JP)

( * ) Notice: Subject to any disclaimer, the term of this patent is extended or adjusted under 35 U.S.C. 154(b) by 48 days.

(21) Appl. No.: 14/995,349

(22) Filed: Jan. 14, 2016

(65) Prior Publication Data

US 2016/0203935 A1 Jul. 14, 2016

(30) Foreign Application Priority Data

Jan. 14, 2015 (JP) ................. 2015-005304

(51) Int. Cl.
*H01H 85/20* (2006.01)
*H01M 2/34* (2006.01)
(Continued)

(52) U.S. Cl.
CPC ............ *H01H 85/205* (2013.01); *H01M 2/34* (2013.01); *H01M 10/4257* (2013.01); *H01H 2085/025* (2013.01); *H01M 2200/103* (2013.01)

(58) Field of Classification Search
CPC .......... H01H 85/205; H01H 2085/025; H01M 10/4257; H01M 2/34; H01M 2200/103; H01M 2/347
(Continued)

(56) References Cited

U.S. PATENT DOCUMENTS

| 5,645,448 A * | 7/1997 | Hill ...................... H01H 85/205 439/522 |
| 7,663,466 B1 * | 2/2010 | Jetton .................. H01H 85/044 337/186 |

(Continued)

FOREIGN PATENT DOCUMENTS

JP S58-186157 A 10/1983
JP 11260344 A * 9/1999
(Continued)

OTHER PUBLICATIONS

Seki Yoshinobu, Power Source Breaking Relay Fixing Structure, Sep. 24, 1999, Yazaki Corp, entire document (translation of JP 11260344).*

(Continued)

*Primary Examiner* — Jayprakash N Gandhi
*Assistant Examiner* — Stephen Sul
(74) *Attorney, Agent, or Firm* — Locke Lord LLP

(57) ABSTRACT

Provided is a fusible link unit (electrical component unit) including a fusible link (electrical component), a battery terminal fixed to an electrode post (electrode) of a battery, and a support member formed as a different body from the battery terminal and fixed to the battery, the support member supporting the fusible link (electrical component), in which the fusible link (electrical component) includes a main link body (main electrical component body) and a power supply terminal made of conductive metal to be exposed from the main link body (main electrical component body) and electrically connected to the electrode post (electrode) through the battery terminal, and the support member supports the main link body (main electrical component body) such that the main link body extends in an orthogonal direction substantially orthogonal to an installation surface portion.

7 Claims, 7 Drawing Sheets

(51) Int. Cl.
*H01M 10/42* (2006.01)
*H01H 85/02* (2006.01)

(58) Field of Classification Search
USPC ........ 439/522, 763; 337/227, 231, 260, 208, 337/207
See application file for complete search history.

(56) References Cited

U.S. PATENT DOCUMENTS

| | | | | |
|---|---|---|---|---|
| 2009/0108982 | A1* | 4/2009 | Ohashi | H01H 85/044 337/191 |
| 2010/0019572 | A1* | 1/2010 | Kudo | H01H 85/044 307/10.7 |
| 2012/0302098 | A1* | 11/2012 | Matsumoto | H01H 85/12 439/620.26 |
| 2013/0095696 | A1* | 4/2013 | Matsumura | H01H 85/044 439/620.26 |
| 2015/0236436 | A1* | 8/2015 | Freitag | H01R 11/287 439/763 |

FOREIGN PATENT DOCUMENTS

| | | | | |
|---|---|---|---|---|
| JP | H11-260344 | A | | 9/1999 |
| JP | 2013020811 | A * | 1/2013 | ............ H01M 2/305 |
| JP | 2013-037949 | A | | 2/2013 |

OTHER PUBLICATIONS

Seki Yoshinobu; Sawai Mamoru, "Power Source Breaking Relay Fixing Structure", Sep. 24, 1999, Yazaki Corp, Entire Document (translation of JPH11260344).*

Ohashi Norihiro; Fukunaga Miyuki, "Fuse Unit", Jan. 31, 2013, Yazaki Corp, Entire Document (Translation of JP 2013020811).*

Notification of Reasons for Refusal drafted on Feb. 2, 2017 issued for corresponding Japanese Patent Application No. 2015-005304.

* cited by examiner

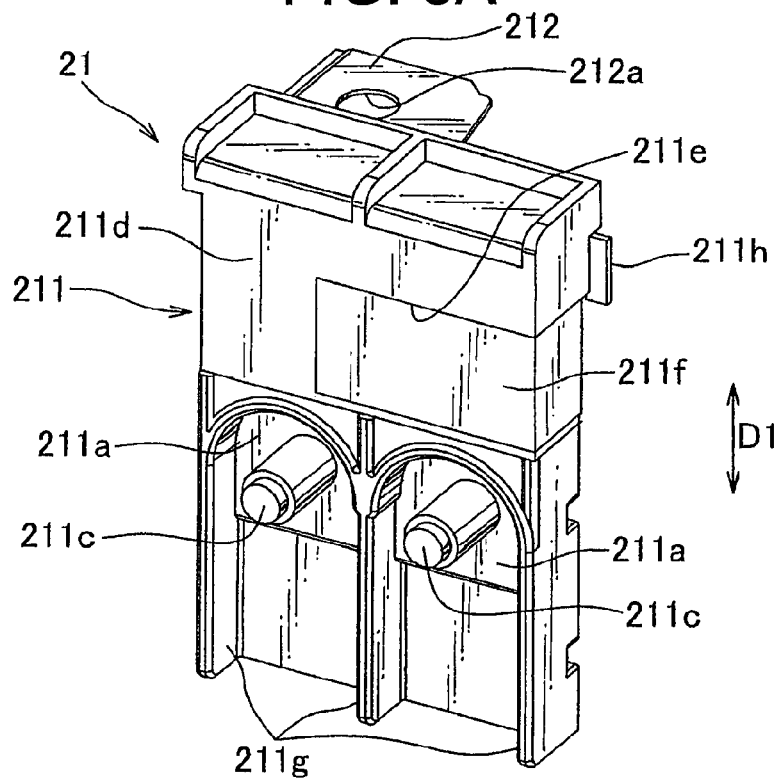
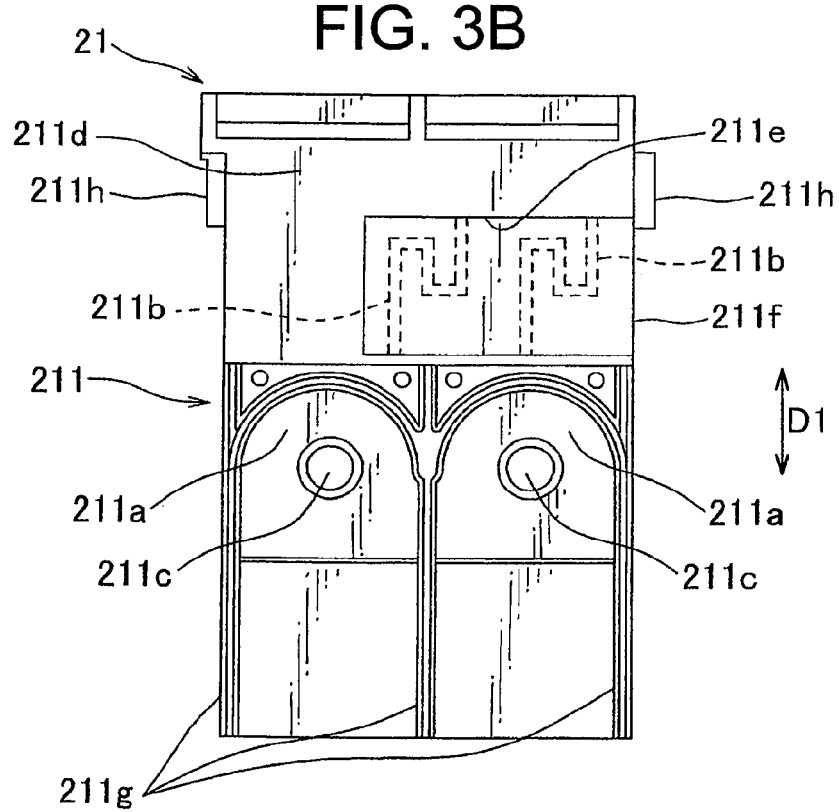

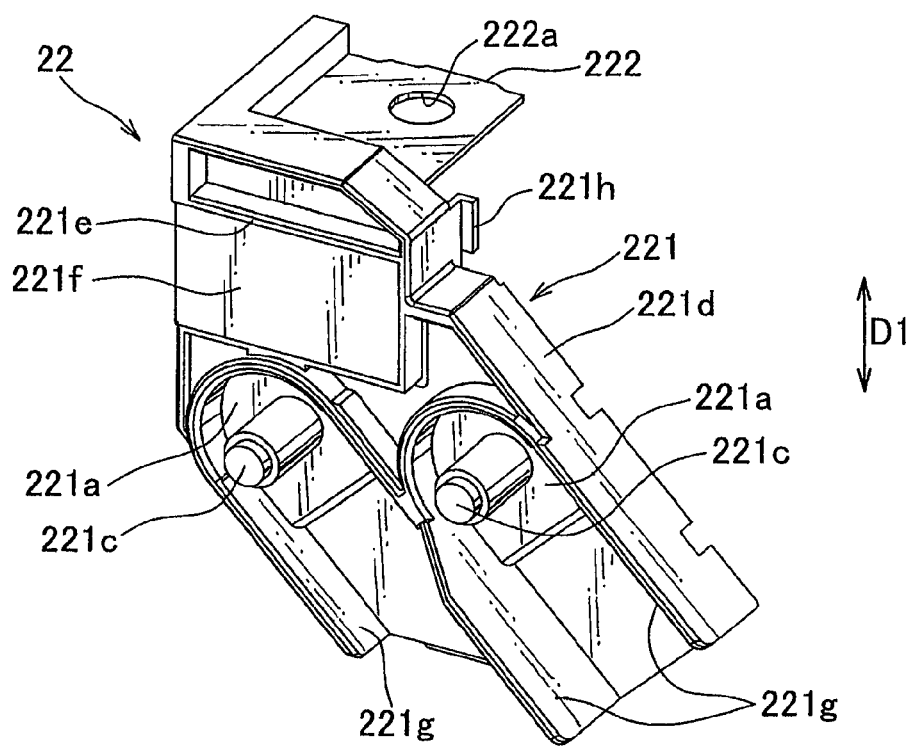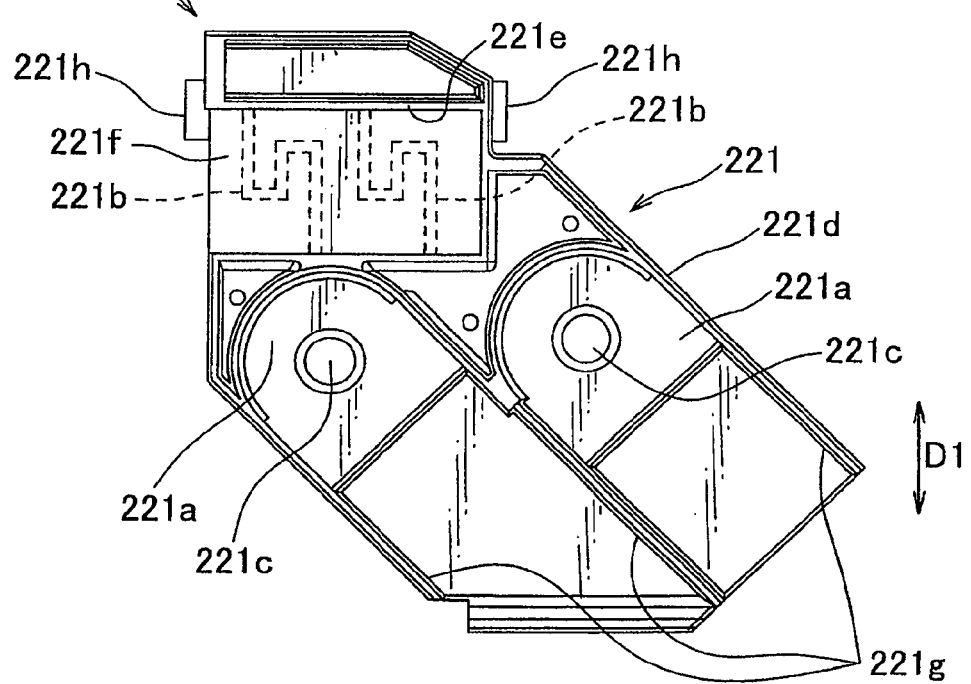

ELECTRICAL COMPONENT UNIT, FUSIBLE LINK UNIT, AND FIXING STRUCTURE

CROSS-REFERENCE TO RELATED APPLICATION

This application claims the benefit of Japanese Patent Application No. 2015-005304 filed on Jan. 14, 2015, the entire disclosure of which is incorporated by reference herein.

BACKGROUND

Technical Field

The present invention relates to an electrical component unit, a fusible link unit, and a fixing structure.

Related Art

There has been a known electrical component unit including a battery terminal fixed to an electrode post of a battery, and an electrical component (for example, a fuse and a fusible link) fixed to the battery terminal (for example, see JP 2013-37949 A). A reinforcing p late, into which a bolt vertically arranged on the battery terminal can be inserted, is provided in the electrical component unit disclosed in JP 2013-37949 A, and the electrical component is fixed to the battery when a power supply side terminal of the electrical component serving as a nut is fastened to the bolt of the battery terminal through the reinforcing plate.

However, a conventional electrical component unit as described in JP 2013-37949 A has a configuration in which an electrical component is fixed to an electrode of a battery. Therefore, a full load of the electrical component is applied to the electrode, and thus a load on the electrode increases.

The invention focuses the above-mentioned problem, and an object of the invention is to provide an electrical component unit capable of reducing a load of the electrical component applied to an electrode of a battery a fusible link unit, and a fixing structure for fixing the electrical component to the battery.

SUMMARY

To solve the above-mentioned problem, a first aspect of the present invention provides an electrical component unit including: an electrical component fixed to an installation surface portion included in a battery; a battery terminal fixed to an electrode extruding from the installation surface portion of the battery; and a support member formed as a different body from the battery terminal and fixed to the battery the support member supporting the electrical component, wherein the electrical component includes a main electrical component body and a power supply terminal made of conductive metal to be exposed from the main electrical component body and electrically connected to the electrode through the battery terminal, and the support member supports the main electrical component body such that the main electrical component body extends in an orthogonal direction substantially orthogonal to the installation surface portion.

Further, a second aspect of the present invention provides the electrical component unit according to the first aspect, wherein the support member extends in the orthogonal direction and is provided with a pair of grooves having openings facing each other, and the main electrical component body is provided with a pair of projections into which the pair of grooves fits.

Further, a third aspect of the present invention provides the electrical component unit according to the first or second aspect, wherein the support member includes a main body supporting portion supporting the main electrical component body such that the main electrical component body extends in the orthogonal direction, and a terminal fixing portion disposed in a position separated from the main body supporting portion and the battery terminal, the power supply terminal being fixed to the terminal fixing portion, and the power supply terminal is electrically connected to the battery terminal by a connection member having one end fixed to the battery terminal and the other end fixed to the terminal fixing portion.

To solve the above-mentioned problem, a fourth aspect of the present invention provides a fusible link unit including: a fusible link fixed to an installation surface portion included in a battery to supply power from the battery to a circuit operating by receiving the power through a fuse element fusing when a current of a threshold value or more flows; a battery terminal fixed to an electrode protruding from the installation surface portion of the battery; and a support member formed as a different body from the battery terminal and fixed to the battery the support member supporting the fusible link, wherein the fusible link includes a main link body and a power supply terminal made of conductive metal to be exposed from the main link body and electrically connected to the electrode through the battery terminal, and the support member supports the main link body such that the main link body extends in an orthogonal direction substantially orthogonal to the installation surface portion.

To solve the above-mentioned problem, a fifth aspect of the present invention provides a fixing structure for fixing an electrical component to a battery, wherein the battery includes an installation surface portion for installing the electrical component and an electrode extruding from the installation surface portion, a battery terminal being fixed to the electrode, the electrical component includes a main electrical component body and a power supply terminal made of conductive metal to be exposed from the main electrical component body and electrically connected to the electrode through the battery terminal, and a support member formed as a different body from the battery terminal and fixed to the battery supports the main electrical component body such that the main electrical component body extends in an orthogonal direction substantially orthogonal to the installation surface portion.

According to the first, fourth, and fifth aspects of the invention, the support member formed as a different body from the battery terminal and fixed to the battery supports the main electrical component body (main link body in the fourth aspect of the invention) such that the main electrical component body extends in the orthogonal direction which is substantially orthogonal to the installation surface portion. As a result, a load of the electrical component (fusible link in the fourth aspect of the invention) is sustained by the support member, and thus it is possible to reduce a load of the electrical component applied to the electrode of the battery.

In addition, according to the second aspect of the invention, the pair of grooves contributing to support of the electrical component serves as a guide when the electrical component is attached such that the electrical component extends in the orthogonal direction. In this way it is possible to improve workability in an operation of attaching the electrical component.

Further, according to the third aspect of the invention, the support member includes the terminal fixing portion, which is disposed in a position separated from the main body supporting portion and the battery terminal and to which the power supply terminal of the electrical component is fixed, in addition to the main body supporting portion. As a result, most of the load of the electrical component is imposed on the terminal fixing portion and the main body supporting portion in the support member. Therefore, it is possible to further reduce a load of the electrical component applied to the electrode of the battery.

BRIEF DESCRIPTION OF DRAWINGS

FIGS. 3A and 3B are diagrams illustrating the first fusible link illustrated in FIG. 1;

FIGS. 4A and 4B are diagrams illustrating the second fusible link illustrated in FIG. 1;

DETAILED DESCRIPTION

Figure 1:
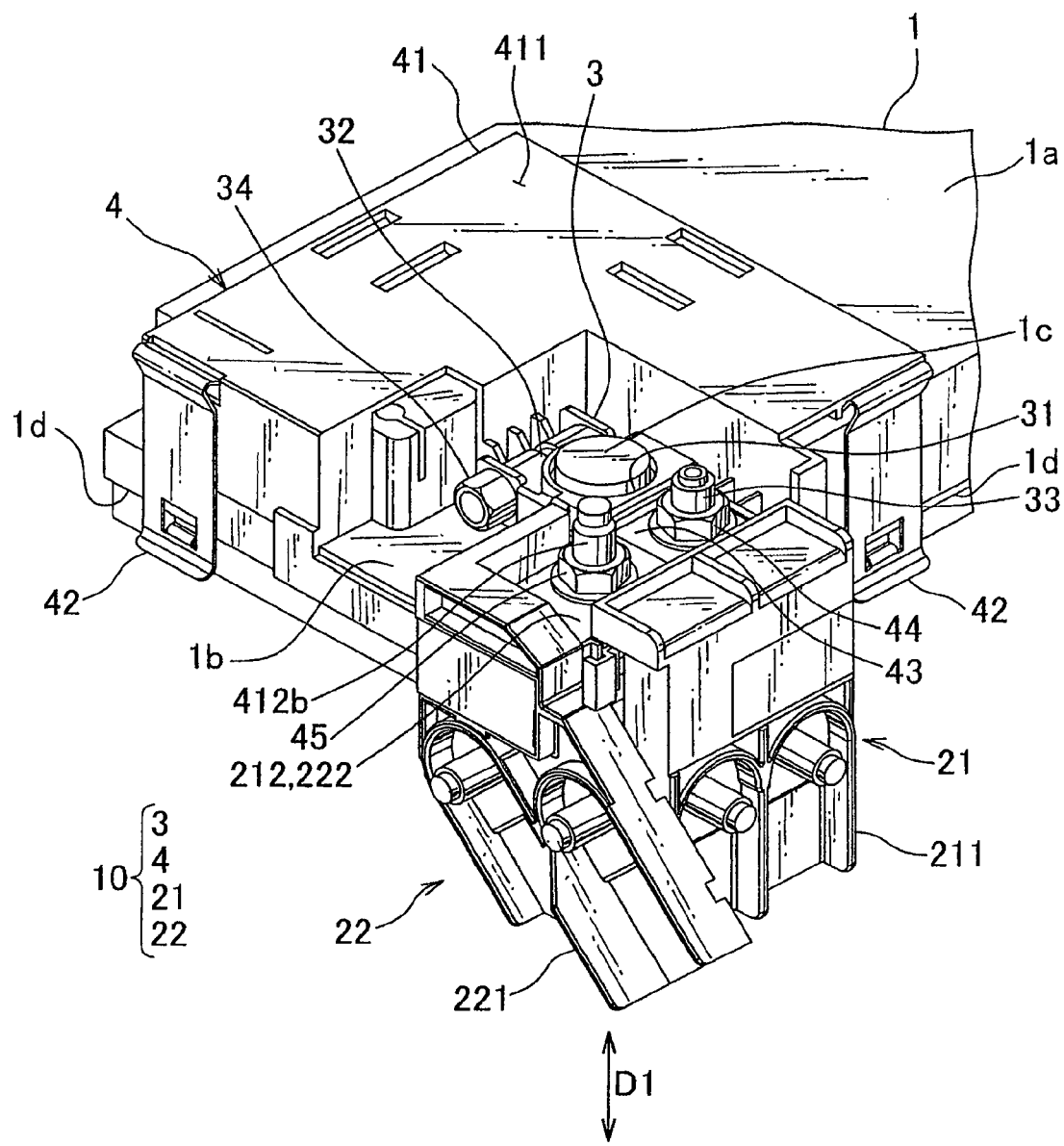
FIG. 1 is a perspective view illustrating a fusible link unit of a first embodiment of the invention.

A description will be given of a first embodiment pertaining to an electrical component unit, a fusible link unit, and a fixing structure of the invention with reference to FIGS. 1 to 4. FIG. 1 is a perspective view illustrating the fusible link unit of the first embodiment of the invention. The fusible link unit 10 illustrated in FIG. 1 includes a first fusible link 21, a second fusible link 22, a battery terminal 3, and a support member 4. The first fusible link 21 and the second fusible link 22 are fixed to an installation surface portion 1b included in a battery 1, and correspond to an example of an electrical component mentioned in the invention. The battery terminal 3 is fixed to an electrode post 1c (electrode) extruding from the installation surface portion 1b of the battery 1. The support member 4 is formed as a different body from the battery 1 and fixed to the battery 1, and is a member that supports the first fusible link 21 and the second fusible link 22.

The fusible link unit 10 illustrated in FIG. 1 corresponds to an example of the electrical component unit mentioned in the invention, and corresponds to an example of the fusible link unit mentioned in the invention. In addition, a structure for fixing the first fusible link 21 and the second fusible link 22 to the battery 1 in the fusible link unit 10 corresponds to an example of the fixing structure mentioned in the invention.

Figure 2:
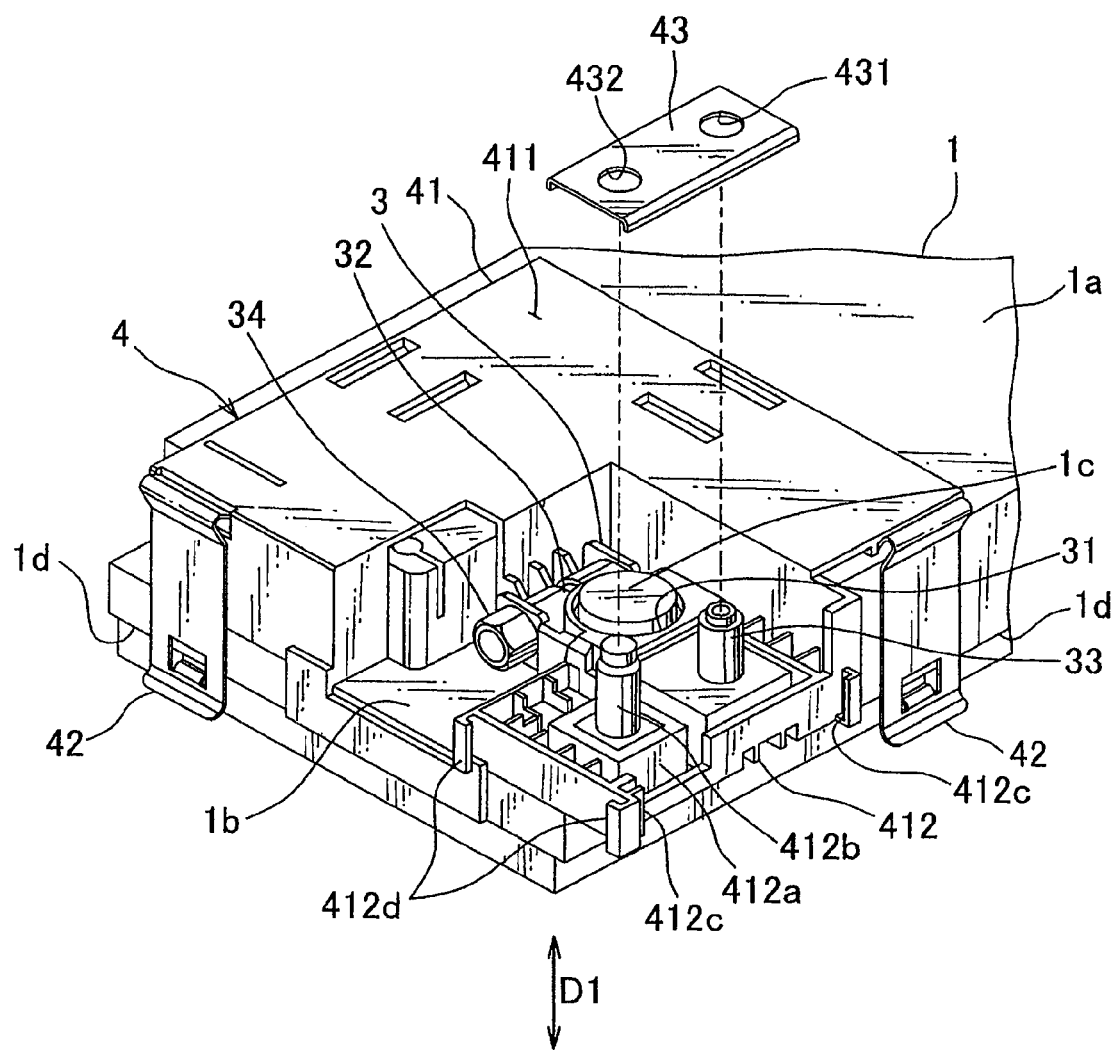
FIG. 2 is a perspective view illustrating a state in which a first fusible link and a second fusible link are removed from the fusible link unit illustrated in FIG. 1.

FIG. 2 is a perspective view illustrating a state in which the first fusible link and the second fusible link are removed from the fusible link unit illustrated in FIG. 1, FIGS. 3A and 3B are diagrams illustrating the first fusible link illustrated in FIG. 1, and FIGS. 4A and 4B are diagrams illustrating the second fusible link illustrated in FIG. 1. Referring to FIGS. 3A and 3B and FIGS. 4A and 4B, perspective views are illustrated in FIG. 3A and FIG. 4A, and front views are illustrated in FIG. 3B and FIG. 4B.

In the present embodiment, the battery 1 mostly has a shape of a rectangular parallelepiped. A neighboring portion of an arbitrary corner on an upper surface 1a is lowered by one step from another portion on the upper surface 1a, and the portion lowered by one step corresponds to the installation surface portion 1b for installation of the first fusible link 21 and the second fusible link 22. The electrode post 1c for extracting power from the battery 1 extrudes from the installation surface portion 1b.

The battery terminal 3 described below is fixed to the electrode post 1c. The battery terminal 3 is mostly formed in a shape of a rectangular parallelepiped, and is provided with an electrode insertion hole 31, into which the electrode post 1c is inserted, on one end side thereof in a longitudinal direction, and a notch 32 reaching the electrode insertion hole 31. In addition, a bolt 33 for electrically connecting the first fusible link 21 and the second fusible link 22 is vertically arranged on the other end side in the longitudinal direction.

Herein, a diameter of the electrode insertion hole 31 is reduced by shortening a width of the notch 32, and the battery terminal 3 is provided with a clamp screw 34 for shortening the width of the notch 32. When the clamp screw 34 is screwed, the width of the notch 32 is shortened, thereby reducing the diameter of the electrode insertion hole 31. When the clamp screw 34 is screwed and thus the diameter of the electrode insertion hole 31 is reduced while the electrode post 1c is inserted into the electrode insertion hole 31, the battery terminal 3 is mechanically fixed and electrically connected to the electrode post 1c.

In addition, in the present embodiment, the support member 4 that supports the first fusible link 21 and the second fusible link 22 is fixed to the battery 1. The support member 4 includes a main support member body 41 made of resin and two locking metal fittings 42 locked in locked portions 1d at two places in total provided on two respective outer lateral surfaces orthogonal to each other in the battery 1. The main support member body 41 includes a first portion 411 that covers the upper surface 1a of the battery 1 and a step-side surface ranging from the upper surface 1a to the installation surface portion 1b, and a second portion 412 surrounding the other end side on which the bolt 33 is vertically arranged in the battery terminal 3. Here, the first fusible link 21 and the second fusible link 22 are attached to the second portion 412. As illustrated in FIG. 1, the first fusible link 21 and the second fusible link 22 are supported by the second portion 412 such that the first fusible link 21 and the second fusible link 22 extend in an orthogonal direction D1 which is substantially orthogonal to the installation surface portion 1b.

As illustrated in FIGS. 3A and 3B, the first fusible link 21 includes a main link body 211 (a main electrical component body), and a power supply terminal 212 made of conductive metal to be exposed from the main link body 211 and electrically connected to the electrode post 1c through the battery terminal 3. The main link body 211 is mostly a rectangular member in a plan view, and includes two circuit terminals 211a and two fuse elements 211b.

The power supply terminal 212 is provided to extrude from a portion near an upper edge of a surface of the first fusible link 21 that faces a side of the battery 1 substantially vertically with respect to the surface when the first fusible link 21 is attached to the second portion 412 in the main support member body 41. The power supply terminal 212 is formed in a plate-like shape using conductive metal, and is provided with one through-hole 212a.

A terminal of a harness (not illustrated), which is formed in a plate-like shape using conductive metal and reaches a circuit that operates by power from the battery 1, is connected to each of the two circuit terminals 211a. Bolts 211c, each of which is connected to the terminal of the harness, are vertically arranged in the respective circuit terminals 211a to extrude in an opposite direction to a direction in which the power supply terminal 212 extrudes. The two circuit terminals 211a are disposed side by side to extend in a direction orthogonal to the power supply terminal 212 such that surfaces, on which the bolts 211c are vertically arranged, are on the same plane.

The two respective fuse elements 211b are formed in bent belt-like shapes, and have one ends connected to the circuit terminals 211a and the other ends connected to the power supply terminal 212. Currents from the battery 1 flow to the respective circuit terminals 211a through the respective fuse elements 211b. In addition, an excess current is prevented from flowing to downstream sides of the respective circuit terminals 211a by the fuse elements 211b that fuse when a current of a threshold value or more flows.

A structure including the power supply terminal 212, the two circuit terminals 211a, and the two fuse elements 211b is molded from an insulating resin material and formed in the main link body 211. A resin housing 211d made of an insulating resin material covers a portion of the structure and solidifies while connection surfaces of the power supply terminal 212 and the respective circuit terminals 211a are exposed and a window 211e is provided such that fusing of the fuse elements 211b is recognizable. The resin housing 211d is formed to be integrated with the structure by insert molding. The window 211e for recognizing fusing in the resin housing 211d is covered with a transparent cover 211f, and fusing of the fuse elements 211b may be recognized through the transparent cover 211f. In addition, a guide wall 211g is formed in the resin housing 211d to guide the harness, which is terminal-connected to each of the circuit terminals 211a, such that the harness is wired along a longitudinal direction of the main link body 211 having a rectangular shape in a plan view. The harness is wired along the orthogonal direction D1 by the guide wall 211g when the first fusible link 21 is attached to the second portion 412 of the main support member body 41. In addition, a pair of projections 211h for supporting the main link body 211 by the second portion 412 of the main support member body 41 is formed at both left and right end edges on a side of the power supply terminal 212 in the resin housing 211d.

The second fusible link 22 has substantially the same configuration as that of the first fusible link 21 except that the harness is wired by being inclined with respect to the orthogonal direction D1 when the second fusible link 22 is attached to the second portion 412 of the main support member body 41. As illustrated in the FIGS. 4A and 4B, the second fusible link 22 includes a main link body 221 (a main electrical component body), and a power supply terminal 222 made of conductive metal to be exposed from the main link body 221 and electrically connected to the electrode post 1c through the battery terminal 3. The power supply terminal 222 is formed in a plate-like shape using conductive metal and is provided with one through-hole 222a.

The main link body 221 is formed by molding a structure including the power supply terminal 222, two circuit terminals 221a, and two fuse elements 221b from an insulating resin material. A bolt 221c, to which a terminal of a harness (not illustrated) is connected, is vertically arranged in each of the two circuit terminals 221a. A resin housing 221d made of an insulating resin material covers a portion of the structure and solidifies while connection surfaces of the power supply terminal 222 and the respective circuit terminals 221a are exposed and a window 221e is provided such that fusing of the fuse elements 221b is recognizable. The resin housing 221d is formed to be integrated with the structure by insert molding. The window 221e for recognizing fusing in the resin housing 221d is covered with a transparent cover 221f, and fusing of the fuse elements 221b may be recognized through the transparent cover 221f. In addition, a guide wall 221g is formed in the resin housing 221d to guide the harness which is terminal-connected to each of the circuit terminals 221a. In the second fusible link 22, the guide wall 221g is inclined such that the harness is wired by being inclined with respect to the orthogonal direction D1 when the second fusible link 22 is attached to the second portion 412 of the main support member body 41. In addition, a pair of projections 221h for supporting the main link body 221 by the second portion 412 of the main support member body 41 is formed at both left and right end edges on a side of the power supply terminal 222 in the resin housing 221d.

In addition, as illustrated in FIG. 2, a terminal fixing portion 412a, to which the power supply terminal 212 of the first fusible link 21 and the power supply terminal 222 of the second fusible link 22 are fixed, is provided in the second portion 412 of the main support member body 41 of the support member 4. The terminal fixing portion 412a is disposed in a position separated from the battery terminal 3, and a bolt 412b for fixing the two power supply terminals 212 and 222 is vertically arranged.

A bus bar 43 formed in a plate-like shape using conductive metal is bridged between the terminal fixing portion 412a and a vertically arranged portion of the bolt 33 in the battery terminal 3. The bus bar 43 is provided with a through-hole 431 into which the bolt 33 of the battery terminal 3 penetrates on one end side, and a through-hole 432 into which the bolt 412b of the terminal fixing portion 412a penetrates on the other end side.

As illustrated in FIG. 1, the bus bar 43 on a side of the battery terminal 3 is fixed to the battery terminal 3 when a nut 44 is screwed to the bolt 33 penetrating into the through-hole 431. Meanwhile, the power supply terminal 212 of the first fusible link 21 and the power supply terminal 222 of the second fusible link 22 are superimposed on the bus bar 43 on a side of the terminal fixing portion 412a. In addition, when a nut 45 is screwed to the bolt 412b of the terminal fixing portion 412a penetrating into the through-hole 432 of the bus bar 43 and the through-holes 212a and 222a of the two power supply terminals 212 and 222, the bus bar 43 and the two power supply terminals 212 and 222 are tightened together and fixed to the terminal fixing portion 412a. In this way, the two power supply terminals 212 and 222 are electrically connected to the battery terminal 3 by the bus bar 43 having one end fixed to the battery terminal 3 and the other end fixed to the terminal fixing portion 412a.

Further, as illustrated in FIG. 2, in the second portion 412 of the main support member body 41 of the support member 4, a pair of first grooves 412c (a pair of grooves and a main body supporting portion) is provided to support the first fusible link 21, and a pair of second grooves 412d (a pair of grooves and a main body supporting portion) is provided to support the second fusible link 22. The pair of first grooves 412c is provided to extend in the orthogonal direction D1, which is substantially orthogonal to the installation surface portion 1b, and have openings facing each other. In addition, the pair of second grooves 412d is also similarly provided. Further, the pair of first grooves 412c is provided on a side surface of the second portion 412 parallel to an array direction of the two bolts 33 and 412b and separated from the terminal fixing portion 412a. In addition, the pair of second grooves 412d is provided on a side surface orthogonal to the array direction and separated from the terminal fixing portion 412a.

Furthermore, when the pair of projections 211h provided on the first fusible link 21 is fit into the pair of first grooves 412c by sliding from above the pair of first grooves 412c, the main link body 211 of the first fusible link 21 is supported such that the main link body 211 extends in the orthogonal direction D1. Similarly, when the pair of projections 221h provided on the second fusible link 22 is fit into the pair of second grooves 412d by sliding from above the pair of second grooves 412d, the main link body 221 of the second fusible link 22 is supported such that the main link body 221 extends in the orthogonal direction D1.

According to the fusible link unit 10 of the present embodiment described above, the pair of first grooves 412c and the pair of second grooves 412d in the support member 4 fixed to the battery 1 which is formed as a different body from the battery terminal 3 support the main link bodies 211 and 221 of the two respective fusible links 21 and 22 such that the main link bodies 211 and 221 extend in the orthogonal direction D1 which is substantially orthogonal to the installation surface portion 1b. As a result, loads of the two fusible links 21 and 22 are sustained by the respective grooves 412c and 412d in the support member 4, and thus it is possible to reduce the loads of the two fusible links 21 and 22 applied to the electrode post 1c of the battery 1.

Moreover, according to the fusible link unit 10 of the present embodiment, the pair of grooves 412c and 412d contributing to support of the two fusible links 21 and 22 serves as a guide when the respective fusible links 21 and 22 are attached such that the fusible links 21 and 22 extend in the orthogonal direction D1. In this way it is possible to improve workability in an operation of attaching the respective fusible links 21 and 22.

Further, according to the fusible link unit 10 of the present embodiment, the support member 4 includes the terminal fixing portion 412a, which is disposed in a position separated from the respective grooves 412c and 412d and the battery terminal 3 and to which the power supply terminals 212 and 222 of the respective fusible links 21 and 22 are fixed, in addition to the pair of first grooves 412c and the pair of second grooves 412d. As a result, most of the loads of the two fusible links 21 and 22 are imposed on the pair of first grooves 412c, the pair of second grooves 412d, and the terminal fixing portion 412a in the support member 4. In this way it is possible to further reduce a load applied to the electrode post 1c of the battery 1.

Figure 6:
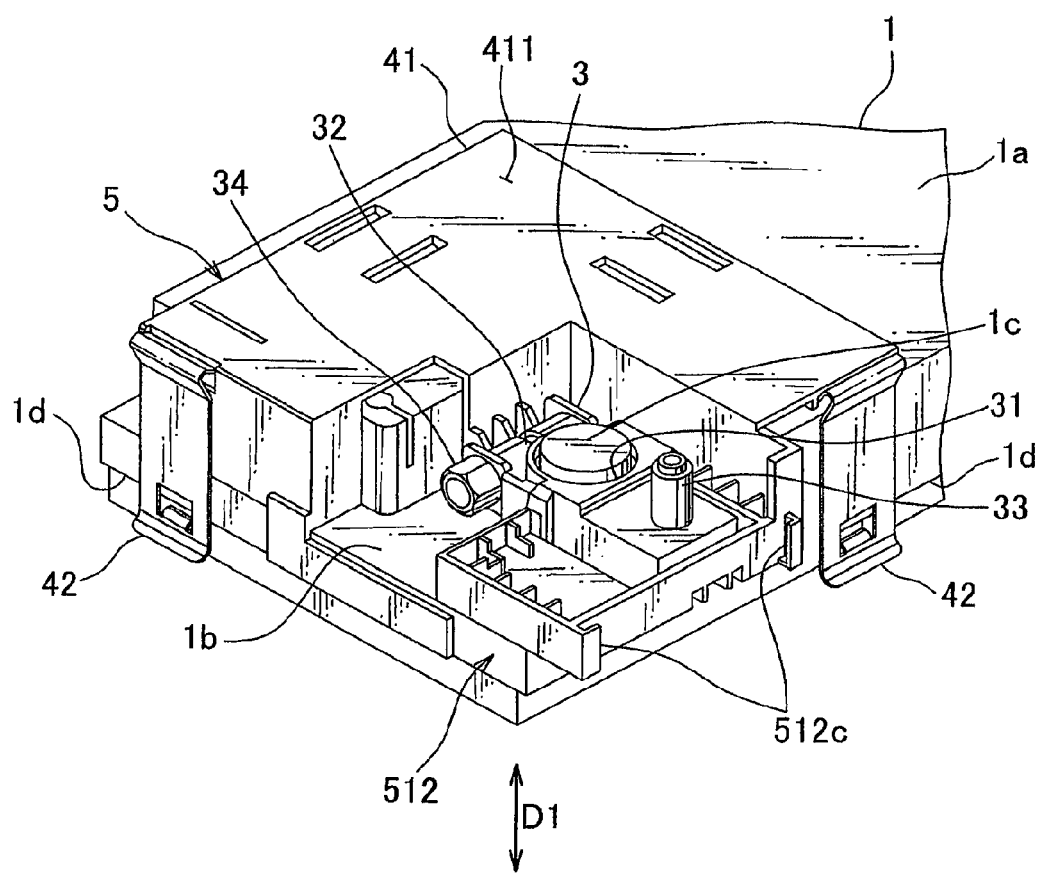
FIG. 6 is a perspective view illustrating a state in which a fusible link is removed from the fusible link unit illustrated in FIG. 5.
Figure 7:
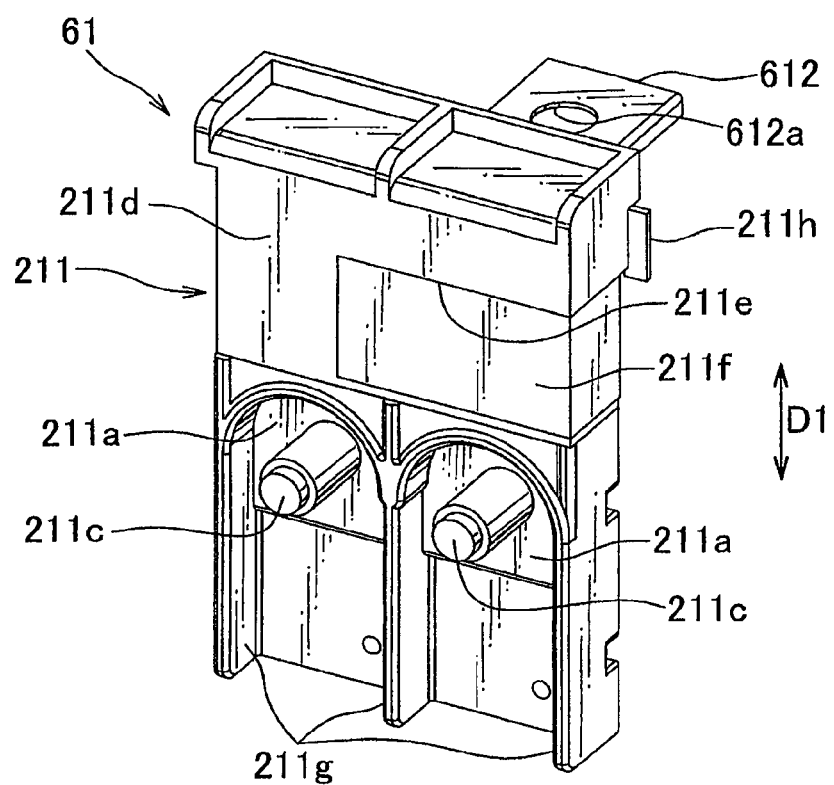
FIG. 7 is a diagram illustrating the fusible link illustrated in FIG. 5.

Next, a description will be given of a second embodiment of the invention with reference to FIGS. 5 to 7. The second embodiment is different from the first embodiment described above in that a terminal fixing portion is not provided and a power supply terminal of a fusible link is fixed to a battery terminal 3. Hereinafter, the second embodiment will be described focusing on a difference from the first embodiment. In addition, referring to FIGS. 5 to 7, the same reference numeral as that of FIGS. 1 to 4B is applied to a component equivalent to a component illustrated in FIGS. 1 to 4B, and repeated description of the equivalent component will be omitted.

Figure 5:
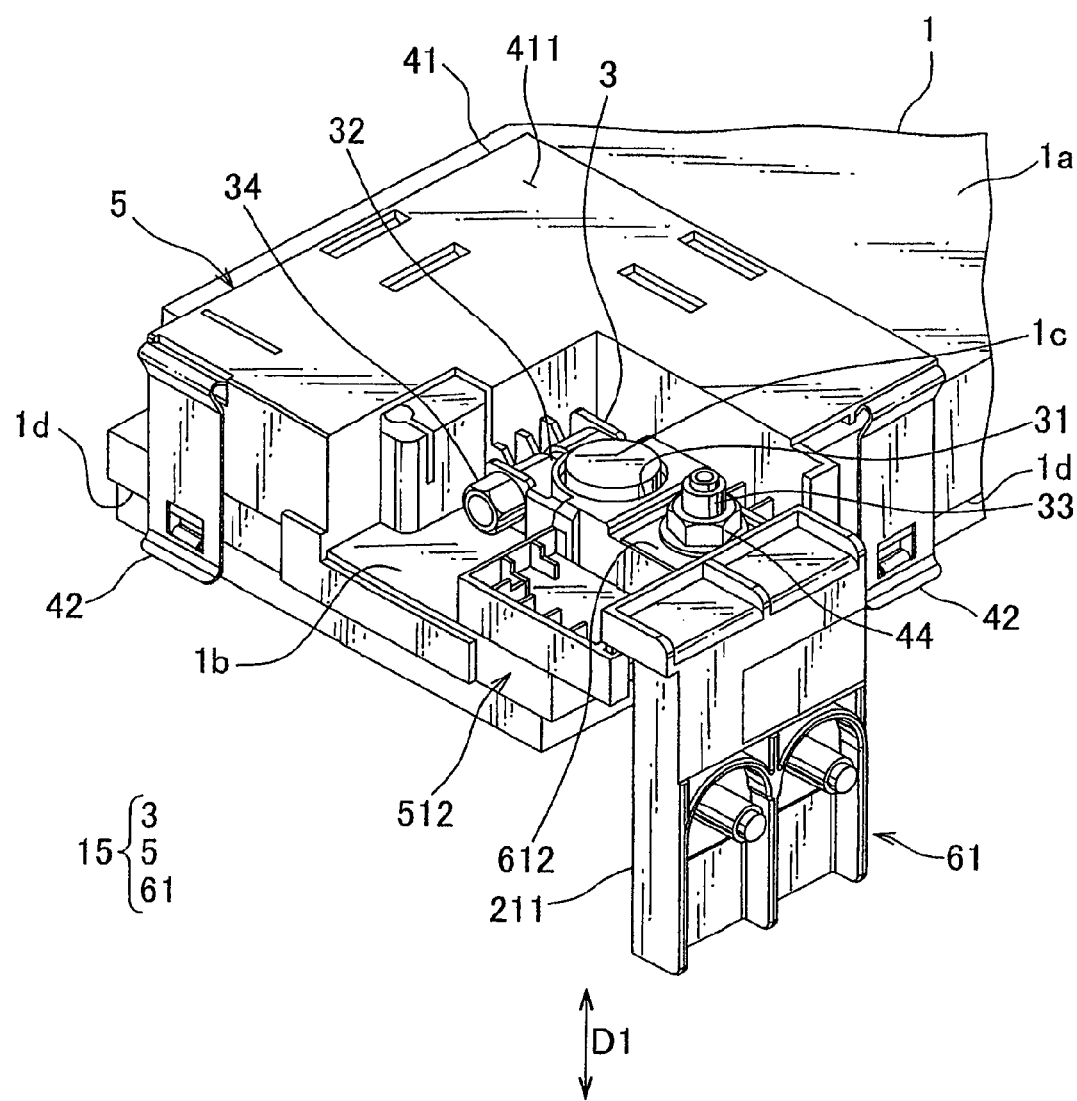
FIG. 5 is a perspective view illustrating a fusible link unit of a second embodiment of the invention.

FIG. 5 is a perspective view illustrating a fusible link unit of the second embodiment of the invention. In the fusible link unit 15 illustrated in FIG. 5, an electrical component fixed to the battery 1 corresponds to one fusible link 61. FIG. 6 is a perspective view illustrating a state in which a fusible link is removed from the fusible link unit illustrated in FIG. 5, and FIG. 7 is a diagram illustrating the fusible link illustrated in FIG. 5.

In the present embodiment, a support member 5 for supporting the fusible link 61 is fixed to a battery 1 when locking metal fittings 42 provided in a first portion 411 of a main support member body 41 are locked in locked portions 1d provided on a lateral surface of the battery 1. In addition, in a second portion 512 of the main support member body 41, a configuration corresponding to the terminal fixing portion 412a illustrated in FIG. 2 is not provided, and a pair of grooves 512c corresponding to the pair of first grooves 412c illustrated in FIG. 2 is provided.

The fusible link 61 includes a configuration substantially equivalent to the first fusible link 21 illustrated in FIGS. 3A and 3B. That is, the fusible link 61 includes a main link body 211 and a power supply terminal 612. The main link body 211 is identical to the main link body 211 of the first fusible link 21 illustrated in FIGS. 3A and 3B, and includes the two circuit terminals 211a provided with the bolts 211c for fixing harness terminals and the two fuse elements 211b (see FIGS. 3A and 3B). A structure including the power supply terminal 612, the two circuit terminals 211a, and the two fuse elements 211b (see FIG. 2) is covered with a resin housing 211d while connection surfaces of the respective terminals are exposed and a window 211e for recognizing the fuse elements is provided. The window 211e is covered with a transparent cover 211f, and fusing of the fuse elements 211b is recognized through the transparent cover 211f. In addition, the resin housing 211d is provided with a pair of projections 211h for supporting the fusible link 61 by the second portion 512 of the main support member body 41.

Herein, in the present embodiment, when the pair of projections 211h provided in the main link body 211 of the fusible link 61 is fit into the pair of grooves 512c provided in the second portion 512 of the main support member body 41 by sliding from above the pair of grooves 512c, the fusible link 61 is supported by the main support member body 41 such that the fusible link 61 extends in the orthogonal direction D1 which is substantially orthogonal to the installation surface portion 1b. On the other hand, the power supply terminal 612 of the fusible link 61 is directly fixed to the battery terminal 3. For this reason, in the present embodiment, the power supply terminal 612 is provided in a position superimposed on the battery terminal 3 unlike the power supply terminal 212 of the first fusible link 21 illustrated in FIGS. 3A and 3B. In addition, the power supply terminal 612 is provided with a through-hole 612a into which a bolt 33 of the battery terminal 3 penetrates, and the power supply terminal 612 is fixed to the battery terminal 3 when a not 44 is screwed to the bolt 33 penetrating into the through-hole 612a.

In the fusible link unit 15 of the second embodiment described above, even though a load of the fusible link 61 is slightly applied to an electrode post 1c through the battery terminal 3, the most part of the load of the fusible link 61 is shared by the pair of grooves 512c (a pair of grooves and a main body supporting portion) of the second portion 512 in the main support member body 41. In this way in the second embodiment, it is possible to reduce the load of the fusible link 61 applied to the electrode post 1c similarly to the fusible link unit 10 of the first embodiment described above.

Further, similarly to the first embodiment described above, the pair of grooves 512c serves as a guide when the fusible link 61 are attached such that the fusible link 61 extends in the orthogonal direction D1, and thus workability in an operation of attaching the fusible link 61 is improved.

The two embodiments described above merely indicate typical embodiments of the invention, and the invention is not limited to the embodiments. In other words, the invention may be implemented by being variously changed within a range not departing from the subject matter of the invention. These changes are within the scope of the invention as long as configurations of the electrical component unit, the fusible link unit, and the fixing structure of the invention are included therein.

For example, both in the first embodiment and in the second embodiment described above, the fusible links 21 22, and 61 are given as examples of the electrical component mentioned in the invention. However, the electrical component mentioned in the invention is not limited thereto. A component other than the fusible link such as a fuse, and a relay of a single body may be included in the examples as long as the component is an electrical component electrically connected to an electrode of a battery through a battery terminal, and a specific aspect thereof is not an issue.

In addition, both in the first embodiment and in the second embodiment described above, the support member 4 fixed to the battery 1 by locking of the locking metal fittings 42 is given as an example of the support member mentioned in the invention. However, the support member mentioned in the invention is not limited thereto. A member screwed to a battery may be included in the example as long as the member is fixed to the battery, and a specific aspect of fixing the member to the battery is not an issue.

Further, both in the first embodiment and in the second embodiment described above, the support member 4 including the pair of grooves, into which the pair of projections provided on the fusible link (electrical component) is fit, is given as an example of the support member mentioned in the invention. However, the support member mentioned in the invention is not limited thereto. A member to which a main electrical component body is screwed may be included in the example as long as the member is formed as a different body from a battery terminal and fixed to a battery to support the main electrical component body in the electrical component such that the main electrical component body extends in an orthogonal direction which is substantially orthogonal to an installation surface portion of the battery, and a specific aspect of supporting is not an issue.

Furthermore, in the first embodiment described above, the bus bar 43, which has the one end fixed to the battery terminal 3 and the other end fixed to the terminal fixing portion 412*a* provided in the second portion 412 of the main support member body 41, is given as an example of the connection member mentioned in the invention. However, the connection member mentioned in the invention is not limited thereto. A member other than the bus bar such as a wire with a terminal may be included in the example as long as the member connects a power supply terminal fixed to a terminal fixing portion to a battery terminal, and a specific aspect thereof is not an issue.

What is claimed is:

1. An electrical component unit comprising:
   an electrical component fixed to an installation surface portion included in a battery;
   a battery terminal fixed to an electrode extruding from the installation surface portion of the battery; and
   a support member formed as a different body from the battery terminal and fixed to the battery, the support member supporting the electrical component,
   wherein
   the electrical component includes a main electrical component body and a power supply terminal made of conductive metal to be exposed from the main electrical component body and electrically connected to the electrode through the battery terminal,
   the installation surface portion of the battery is placed lower than a top surface of the battery with a side wall placed therebetween,
   the support member comprises: a first part covering the top surface of the battery and the side wall of the battery; and a second part being a wall surrounding the power supply terminal and extending vertically from the installation surface portion, and
   the second part of the support member supports the main electrical component body extending in a direction substantially orthogonal to the installation surface portion.

2. The electrical component unit according to claim 1, wherein the support member extends in the orthogonal direction and is provided with a pair of grooves having openings facing each other, and
   the main electrical component body is provided with a pair of projections into which the pair of grooves fits.

3. The electrical component unit according to claim 2, wherein the support member includes a main body supporting portion supporting the main electrical component body such that the main electrical component body extends in the orthogonal direction, and a terminal fixing portion disposed in a position separated from the main body supporting portion and the battery terminal, the power supply terminal being fixed to the terminal fixing portion, and
   the power supply terminal is electrically connected to the battery terminal by a connection member having one end fixed to the battery terminal and the other end fixed to the terminal fixing portion.

4. The electrical component unit according to claim 1, wherein the support member includes a main body supporting portion supporting the main electrical component body such that the main electrical component body extends in the orthogonal direction, and a terminal fixing portion disposed in a position separated from the main body supporting portion and the battery terminal, the power supply terminal being fixed to the terminal fixing portion, and
   the power supply terminal is electrically connected to the battery terminal by a connection member having one end fixed to the battery terminal and the other end fixed to the terminal fixing portion.

5. The electrical component unit according to claim 1, wherein the support member supports a plurality of electrical components at different edges thereof.

6. A fusible link unit comprising:
   a fusible link fixed to an installation surface portion included in a battery to supply power from the battery to a circuit operating by receiving the power through a fuse element fusing when a current of a threshold value or more flows;
   a battery terminal fixed to an electrode protruding from the installation surface portion of the battery; and
   a support member formed as a different body from the battery terminal and fixed to the battery, the support member supporting the fusible link,
   wherein
   the fusible link includes a main link body and a power supply terminal made of conductive metal to be exposed from the main link body and electrically connected to the electrode through the battery terminal, the installation surface portion of the battery is placed lower than a top surface of the battery with a side wall placed therebetween, the support member comprises: a first part covering the top surface of the battery and the side wall of the battery; and a second part being a wall surrounding the power supply terminal and extending vertically from the installation surface portion, and the second part of the support member supports the main link body extending in a direction substantially orthogonal to the installation surface portion.

7. A fixing structure for fixing an electrical component to a battery, the battery includes an installation surface portion for installing the electrical component and an electrode extruding from the installation surface portion, a battery terminal being fixed to the electrode, the electrical component includes a main electrical component body and a power supply terminal made of conductive metal to be exposed from the main electrical component body and electrically connected to the electrode through the battery terminal, and the installation surface portion of the battery is placed lower than a top surface of the battery with a side wall placed therebetween, a support member comprises: a first part covering the top surface of the battery and the side wall of the battery; and a second part being a wall surrounding the power supply terminal and extending vertically from the installation surface portion, and the second part of the support member, which is formed as a different body from the battery terminal and is fixed to the battery, supports the main electrical component body extending in a direction substantially orthogonal to the installation surface portion.

* * * * *